United States Patent
Castelão Soares

(10) Patent No.: US 12,481,731 B2
(45) Date of Patent: Nov. 25, 2025

(54) METHOD AND SYSTEM FOR RELIABLE AUTHENTICATION OF THE ORIGIN OF A WEBSITE

(71) Applicant: PROOFMARKED, INC., Middletown, DE (US)

(72) Inventor: Marco António Castelão Soares, Lourical (PT)

(73) Assignee: Proofmarked, Lda., Middletown, DE (US)

( * ) Notice: Subject to any disclaimer, the term of this patent is extended or adjusted under 35 U.S.C. 154(b) by 298 days.

(21) Appl. No.: 17/626,153

(22) PCT Filed: Jul. 10, 2020

(86) PCT No.: PCT/IB2020/056523
§ 371 (c)(1),
(2) Date: Jan. 11, 2022

(87) PCT Pub. No.: WO2021/005574
PCT Pub. Date: Jan. 14, 2021

(65) Prior Publication Data
US 2022/0245223 A1    Aug. 4, 2022

(30) Foreign Application Priority Data
Jul. 11, 2019  (PT) ......................................... 115641

(51) Int. Cl.
*G06F 21/12*    (2013.01)
*G06F 21/64*    (2013.01)
(Continued)

(52) U.S. Cl.
CPC .......... *G06F 21/128* (2013.01); *G06F 21/645* (2013.01); *H04L 9/0825* (2013.01); *H04L 9/3247* (2013.01); *G06F 2221/2119* (2013.01)

(58) Field of Classification Search
CPC ...... G06F 1/163; G06F 16/95; G06F 16/9535; G06F 21/36; G06F 21/50; G06F 16/9577;
(Continued)

(56) References Cited

U.S. PATENT DOCUMENTS 7,769,820 B1 * 8/2010 Spies ....................... H04L 63/08
709/219
8,996,485 B1 * 3/2015 Krishnamurthy ....... G06F 21/50
707/705
(Continued)

FOREIGN PATENT DOCUMENTS

EP    1906293 A2    4/2008

OTHER PUBLICATIONS

International Search Report of PCT/IB2020/056253 Mailed on Sep. 18, 2020.
(Continued)

*Primary Examiner* — Dustin Nguyen
(74) *Attorney, Agent, or Firm* — Rivka Friedman

(57) ABSTRACT

The present invention is enclosed in the area of authentication protocols, in particular web-based authentication protocols for reliably determining the origin of a web content, namely a website, and thereby legitimise/certify such website. It is an object of the present invention a method for reliable authentication of the origin of a website which includes obtaining brand digital information which is digitally associated with the website, wherein the brand digital information comprises a registered trademark and the website has a Uniform Resource Indicator (URI) which is digitally associated to the registered trademark in at least one server of a brand verification system. The solution of the present invention takes a completely different approach with regard to the above referred prior art solutions, as it focusses on a brands digital property, by attributing a self-sovereign
(Continued)

identity with which to present itself to its customers/partners, thereby being highly simple and efficient.

13 Claims, 1 Drawing Sheet

(51) Int. Cl.
*H04L 9/08* (2006.01)
*H04L 9/32* (2006.01)

(58) Field of Classification Search
CPC ....... G06F 21/64; G06F 21/567; H04L 9/321;
H04L 63/08; H04L 63/12; H04L 63/20;
H04L 63/1483; H04L 67/02; H04L
61/4511; H04L 61/302; G06K 7/10297;
G06Q 90/00; G06Q 10/00; G06Q 30/02;
G06Q 30/0254; G06Q 50/01; G06N 7/01;
G08B 29/188
See application file for complete search history.

(56) References Cited

U.S. PATENT DOCUMENTS

| | | | | |
|---|---|---|---|---|
| 10,387,889 | B1* | 8/2019 | Hanna | G06Q 50/01 |
| 2005/0216290 | A1* | 9/2005 | Sachs | G06Q 90/00 |
| | | | | 705/26.1 |
| 2005/0283609 | A1* | 12/2005 | Langford | G06F 21/64 |
| | | | | 713/176 |
| 2008/0034211 | A1* | 2/2008 | Shull | H04L 61/4511 |
| | | | | 713/175 |
| 2008/0086638 | A1* | 4/2008 | Mather | G06F 16/95 |
| | | | | 713/168 |
| 2008/0155254 | A1* | 6/2008 | Stradling | H04L 63/20 |
| | | | | 713/157 |
| 2008/0307222 | A1* | 12/2008 | Chow | H04L 63/12 |
| | | | | 713/156 |
| 2009/0077373 | A1* | 3/2009 | Kramer | H04L 9/321 |
| | | | | 713/176 |
| 2010/0031022 | A1* | 2/2010 | Kramer | H04L 63/1483 |
| | | | | 726/3 |
| 2010/0192068 | A1* | 7/2010 | Wineinger | G06F 16/9577 |
| | | | | 715/744 |
| 2011/0090083 | A1* | 4/2011 | Rast | G08B 29/188 |
| | | | | 707/706 |
| 2011/0296492 | A1* | 12/2011 | Todary Michael | H04L 61/302 |
| | | | | 726/3 |
| 2012/0144499 | A1* | 6/2012 | Tan | G06Q 10/00 |
| | | | | 707/E17.061 |
| 2012/0166935 | A1* | 6/2012 | Abhyanker | G06Q 30/02 |
| | | | | 715/234 |
| 2014/0164148 | A1* | 6/2014 | Chanda | G06Q 30/0254 |
| | | | | 705/14.73 |
| 2014/0331119 | A1* | 11/2014 | Dixon | G06F 21/567 |
| | | | | 715/234 |
| 2015/0088847 | A1* | 3/2015 | Nelson | G06F 16/9535 |
| | | | | 707/706 |
| 2016/0308936 | A1* | 10/2016 | Yuan | H04L 67/02 |
| 2017/0232300 | A1* | 8/2017 | Tran | G06F 1/163 |
| | | | | 434/247 |
| 2018/0270272 | A1* | 9/2018 | Sagan | G06F 21/36 |
| 2019/0130508 | A1* | 5/2019 | Lantz | G06N 7/01 |
| 2019/0332754 | A1* | 10/2019 | Andersen | G06K 7/10297 |
| 2020/0092257 | A1* | 3/2020 | Goldstein | H04L 67/02 |

OTHER PUBLICATIONS

Amir Herzberg et al: "TrustBar: Protecting (even Naive) Web Users from Spoofing and Phishing Attacks", Internet Citation, (Nov. 7, 2004), pp. 1-28, XP002628577, URL: http://u.cs.biu.ac.il/~herzbea/Papers/secure%20communication/protecting%20naive%20web%20users.pdf.

* cited by examiner ions of the human beholder. Furthermore, no one is responsible for the content of any webpage, as there is no liable entity that can provide reliable information regarding the content of a webpage. This opens the door to unfortunate events, such as cyber-squatting, typosquatting and reverse domain hijacking, in addition to cyber-impersonation, cyber-extortion, cyber-blackmailing etc. The resent solution completely changes the scheme, as it focuses on a brand digital property, by attributing a self-sovereign identity with which to present itself to its customers/partners.

METHOD AND SYSTEM FOR RELIABLE AUTHENTICATION OF THE ORIGIN OF A WEBSITE

FIELD OF THE INVENTION

The present invention is enclosed in the area of authentication protocols, in particular web-based authentication protocols for reliably determining the origin of a web content, namely a website, and thereby legitimise/certify such website and/or visible content, be it partly or in its entirety, under consent of the rightful proprietor.

PRIOR ART

The World Wide Web has been a beautiful creation that has highly furthered innovation. However, the original protocols that rule the internet have inadvertently created several points of failure to exploit the human factor, while others have simply been missing the purpose for which they were created.

The Domain Name System (DNS) houses over a 1000 generic/Top Level Domains (TLDs and gTLDs) that are considered the privileged address of a Brand/Trademark to communicate with its customers/partners online. This reliance however is misplaced, inefficient and subject to several additional points of human-failure—e.g. reverse DNS hijacking, typosquatting and cyber impersonation.

Transport Layer Security (TLS/SSL), merely confirms the communications security over the internet without any check of the legitimacy of the content on the webpage, which once granted by a Certificate Authority (CAs) exhibits a green lock of trust. Yet again, there is no reason to trust a lock that everyone can exhibit at little to no expense (e.g. https://letsencrypt.org) while the proprietor of that site may sell counterfeited goods, store unencrypted passwords on his database, do credit card details phishing, etc.

Online perpetrators have free reign to act as they please due to the unrestricted, unlimited and undifferentiated nature of the internet—there is no legitimacy requirement to buy a domain or a TLS certificate—on top of which they have all the necessary tools to hide their identities. Furthermore, security protocols are origin/legitimacy agnostic, cops or robbers—there's no tell—you can be sure the connection is secure, but not who is on the other side, e.g. DMARC, DNSSEC. It is an endless game of cat-and-mouse, where the content displayed on a web-page may change at any given time.

From a user perspective, one can disentangle a Web's framework into three different vehicles: the content presented in a Webpage, the URL (Domain) where it is lodged and a Certification Authority. They are however three independent vehicles, without requirements of consistency. So, a webpage's Content can be hosted in any example.com and certified by any CA.

Which makes impersonation and deception particularly easy through the Internet, as a webpage's content is taken at face-value. Prior art provides nor real solution to ingrain legitimacy of the content associated with a URL address, or no liable verifier that the content is indeed legitimate and trustworthy.

The present solution innovatively overcomes such issues.

SUMMARY OF THE INVENTION

It is therefore an object of the present invention a method for reliable authentication of the origin of a website which comprises:

upon a request to access a website by a first device via a web interface, obtaining from a brand verification system a brand digital information, enveloping said brand digital information such that it is presented to the first device via said web interface, wherein obtaining from a brand verification system a brand digital information comprises the brand verification system obtaining brand digital information which is digitally associated with the website, wherein the brand digital information comprises a registered trademark and the website has a Uniform Resource Indicator (URI) which is digitally associated to the registered trademark in at least one server of the brand verification system. Preferably, the brand digital information consists of a registered trademark.

The solution of the present invention takes a holistic approach, which is completely different with regard to the above referred prior art solutions, as it focuses on a brand digital property, by attributing a self-sovereign identity with which to present itself to its customers/partners. This addresses the problem of unauthorized content through the most human-centric design possible, by allowing any web-user to instantly/seamlessly verify in, for instance, an address bar—where the web interface is a web browser—if the webpage being visited is owned or authorized—and thereby legitimized—by the brand they procured/intended through the unique and recognizable logo/trademark. This way, brand proprietors are able to protect themselves from misappropriation of their brands, by preventing illegitimate websites of profiting from the hard-won reputation and customer base. Such solution consequentially saves considerable recurring expenses to companies, as their identities legitimacy shifts from the domain name (over 1000 different gTLDs) to the unique signature/logo that they proudly show.

This innovation changes the game dramatically and solves several market failures, of which some industries have thrived at the expense of others as described below, by applying such holistic approach to the bigger problem—the present lack of tools to enable realistic cyber-trust.

Through a single service we can deliver 3 different market solutions which therefore exponentially increases performance, efficiency and ease-of-use while decreasing costs. The societal benefits should become obvious, as it also provides a superior service, i.e.:

Certification Authorities (CAs) have been through a rollercoaster of trying to adapt within the legacy technology, but even their attempts with Qualified Website Authentication Certificates (QWACS) of the electronic IDentification, Authentication and trust Services (eIDAS) EU regulation or Extended Validation Certificate (EV) (https://en.wikipedia.org/wiki/Extended_Validation_Certificate) ultimately failed over colliding entity names. Furthermore, any programmer can get a certificate, to a domain and exhibit the green lock on the address bar—no questions asked. The current state of affairs just assures the communication over https is encrypted through the web, it says nothing about the identity and legitimacy of the owner of the web address, or if he keeps the user's passwords encrypted. The present solution brings the necessary legitimacy by attaching the value of the brand/trademark to its rightful proprietor via, for instance, WIPO (World Intellectual Property Organization) or another official trademark office.

ICANN's (Internet Corporation for Assigned Names and Numbers) DNS and TLDs is an idea turned bad and a report of such unfortunate events is presented in www.domainnamewire.com. Among the negative externalities one finds cybersquatting, typosquatting and reverse domain hijacking, among others. The present solution completely changes the game by exhibiting a secured brand logo on the address bar (or notification) for authorized domains/URI's, perpetrators therefore become unable to pretend to be e.g. Adidas.

The chasing after perpetrators is the only currently available weapon for companies to defend a brand, which entails several legal actions to stop each and every attempt individually. An ICANN/WIPO cooperation has created Trademark Clearing Houses to mediate and referee disputes over gTLDs, which is a process to fight off malicious individuals preying on valuable brand reputations to profit from.

Instead of chasing after the perpetrators to take down unlawful content, the solution of the present invention legitimizes and brings the authentication to the interface, and the legitimacy to the rightful proprietor. This solution also goes beyond the ping-pong approach to certify contents through a brand registration system. It integrates within the web interface the legitimacy of the URI address, so the web-user is seamlessly aware of whether the content being seen has been authorized by the brand/trademark/company the user trusts. Furthermore, it brings the lawful exclusive property right of trademarks to a digitally encrypted signature that can't be copied or misused—private key (cryptography).

The present invention thereby provides a missing and inventive link, of allowing content publishers to have a separate solution embedded through the browser/operating system component, that provides legitimacy of content to the domain, even by the publishers.

Largely this can be perceived as Branded Self-Sovereign Identities (BSSI). It may be operated through the verification of a private key against a trademarked logo (namely HMAC) with the URL origin of the request. It may then show the logo within the URL address bar, thus enabling a human-centric legitimacy of exhibited content. It provides an essential tool in either a centralized or decentralized Web, where browsers are the gatekeepers, beyond DNS and CA's.

It also thereby empowers users, in a self-serving way, as a person can easily verify if a certain website is owned/allowed by the expected rightful owner. For the sake of clarity, a website that would exhibit a logo that a person doesn't recognize is of no importance to that person and contrarily a logo that they do recognize can easily be contextualized to the content they are viewing.

It is also an object of the present invention a system for reliable authentication of the origin of a website which comprises a first device and a web interface or operating system component configured to implement the method of the present invention, in any of its described embodiments.

Moreover, it is an object of the present invention a non-transitory storage media including program instructions executable to carry out the method of the present invention, in any of its described embodiments.

DETAILED DESCRIPTION

Figure 1:
FIG. 1—a representation of a web browser according to a prior art solution.
Figure 2:
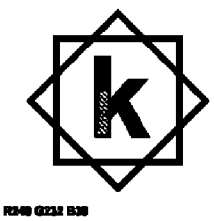
FIG. 2—a trademark which is associated to the website of FIG. 3, and which will lead to the self-serving approach of the present invention.
Figure 3:
FIG. 3—a representation of a web browser operating according to the method of the present invention, in which brand digital information—a registered trademark—is presented in a first device via a web interface which consists of the web browser, thereby providing for a reliable authentication of origin of the website, through a human-centric design.
Figure 4:
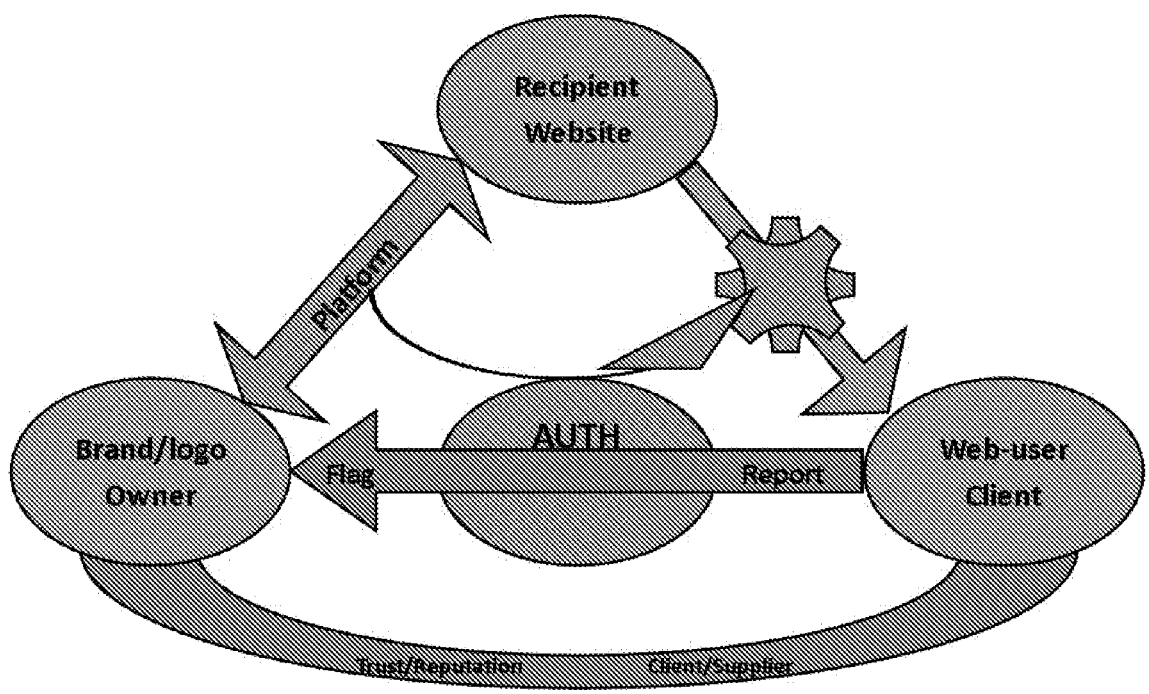
FIG. 4—a representation of the relation between website, brand owner and client of the first device according to the method of the present invention.

The more general and advantageous configurations of the present invention are described in the Summary of the invention. Such configurations are detailed below in accordance with other advantageous and/or preferred embodiments of implementation of the present invention.

In an advantageous embodiment of the method of the present invention, obtaining a brand digital information from a brand verification system further comprises the brand verification system communicating with a brand registration system, the brand registration system consisting of at least one server managed by an official trademark office, such server comprising a plurality of registered trademarks before such official trademark office, each brand digital information comprising with one of such registered trademarks. Such at least one server may also be referred to as an infrastructure which provides for the same referred functionalities.

The brand digital information—and, thus, the registered trademark—are therefore managed in a centralised or decentralized server which is the brand verification system. The brand verification system is configured to further communicate with a brand registration system, which consists of at least one server managed by an official trademark office, and which is recognised as having original registered trademarks, owned by a specific entity, and which are not confoundable with registered trademarks from other entities. Such communication allows the verification of whether a specific brand digital information—registered trademark—is indeed registered. It therefore provides a highly simple and efficient way to implement the method of the present invention.

Moreover, and in another inventive aspect of such embodiment of the method of the present invention, the method includes, prior to the request to access a website by the first device, associating at least one brand digital information with an URI of such website, such association being performed via a root exclusive cryptographic entity. The root exclusive cryptographic entity may comprise:
- the creation of a root digital certificate,
- the creation of a root transactional signature, or
- the creation of a root block in a Blockchain-based method, namely a root address or unique identifier in a Blockchain based method.

A transactional signature may be used to verify the ownership of a trademark, through a verification of keys in the public registry of a trademark official office. In a similar way to the one currently being used to check ownership of domain properties, e.g DMARC setting MX records in the DNS public registry.

Once the ownership of such a trademark has been confirmed and legitimized, a self-sovereign identity is attributed to the trademark owner to verify digital properties that, such trademark owner wants to endorse, which would primarily be the scenario to the domains that the owner directly owns, by shifting the legitimacy of a website from the URI (e.g. typosquatting) to the verified trademark displayed by the present invention. But could equally be used to endorse any commercial connection or endorsement of partner and resellers.

A federated whitelist of each brand can thereby be enforced as per the unique Self-sovereign identity attached to each registered trademark, throughout the World Wide Web, safeguarding the trust and legitimacy necessary between a brand and its customers as they interact digitally with one another. Thus, displacing the current ability of impersonation (e.g typosquatting+web-scrape of a brands website).

Still with regard to such inventive aspect of the present invention, and in a more specific configuration, the method further comprises, upon a request for a root exclusive cryptographic entity, to create at least one subsequent exclusive cryptographic entity from said root exclusive cryptographic entity, each subsequent exclusive cryptographic entity being configured to provide a further association of a brand digital information with an URI of a website. The root exclusive cryptographic entity may be managed by the brand verification system. Such root exclusive cryptographic entity may therefore be centrally (or in a decentralized manner) managed and create an infrastructure of trust—a chain of trust or a federated chain of trust—throughout a stakeholder network.

As an example, in case the exclusive cryptographic entity consists of a root digital certificate, such root digital certificate is configured to sign and thereby create at least one subsequent digital certificate, each subsequent digital certificate being configured to sign with a digital signature an association of a brand digital information with an URI of a website.

In one embodiment:
where the root exclusive cryptographic entity consists of a root digital certificate, it is configured to sign and thereby create at least one subsequent exclusive cryptographic entity which consists of a subsequent digital certificate, each subsequent digital certificate being configured to sign with a digital signature an association of a brand digital information with an URI of a website,
where the root exclusive cryptographic entity consists of a block in a Blockchain-based method, it is configured to further create at least one subsequent exclusive cryptographic entity which consists of a subsequent block in a Blockchain-based method, each subsequent block being configured to associate a brand digital information with an URI of a website,
the least one subsequent exclusive cryptographic entity consists of a keyed-hash message authentication code (HMAC) verification, associating a brand digital information with an URI of a website, as per a chain of trusted entities, endorsing a brand's digital value (supply) chain.

Typically, the owner of a trademark with a reliable authentication of its origin requests a root exclusive cryptographic entity which may subsequently provide to obtain a subsequent exclusive cryptographic entity which in turn may be used to associate a brand digital information to an URI of a website. For instance, for the case of a root digital certificate, a signature by the root digital certificate thereby allows to obtain a subsequent digital certificate, which may be used to digitally sign an association between a brand digital information and an URI of a website.

In another inventive aspect of the method of the present invention, upon a request for a root exclusive cryptographic entity to create at least one subsequent exclusive cryptographic entity, the method further comprises confirming with the brand verification system which consists of at least one server managed by an official trademark office whether such trademark is i) indeed registered and ii) owned by a same entity creation of the at least one subsequent exclusive cryptographic entity. Therefore, the method of the present invention further provides reliability of origin as regards a newly created subsequent exclusive cryptographic entity. If such a trademark is not i) indeed registered or ii) owned by the same entity requesting the root exclusive cryptographic entity and creation of at least one subsequent exclusive cryptographic entity, no subsequent exclusive cryptographic entity is created.

Thus, a confirmation with the national, regional or global official trademark office (e.g. USPTO, EUIPO, WIPO), to determine the ownership right to claim a registered trademark and attribute an exclusive right within the platform. Thus, the method of the present invention provides that no logo/trademark unique root-representative has a duplicate/doppelganger. Moreover, the possibility of combining a registered trademark with a commercial name of the trademark is also foreseen and shall be implemented, if so required by the market.

In yet an additional inventive aspect related to the exclusive cryptographic entity structure, each subsequent exclusive cryptographic entity is further configured to create at least one lower level exclusive cryptographic entity, each lower exclusive cryptographic entity being configured to associate a brand digital information with an URI of a website and, optionally, each lower level exclusive cryptographic entity consists of:
a lower level digital certificate configured to sign with a digital signature an association of a brand digital information with an URI of a website, wherein, preferably, the lower digital certificate is integrated within a public key infrastructure,
a block in a Blockchain-based method configured to associate a brand digital information with an URI of a website, wherein, preferably, the block is integrated within a public ledger,
a keyed-hash message authentication code (HMAC) verification system, within a federated chain of trust of entities, associating a brand digital information with an URI of a website.

Therefore, the method of the present invention provides an additional advantageous functionality directed for the stakeholder network. Other valuable details of the URI may be associated, such as an URL, Domain, or IP.

Typically, a trademark owner requests a subsequent exclusive cryptographic entity before the entity managing the root exclusive cryptographic entity, which typically consists of the brand verification system. However, the trademark owner may consist of a large company, and only the central institution has access to the subsequent exclusive cryptographic entity. In particular, this request may be operated as a revocable ability passed down through the chain/ledger in an ad-hoc manner by the brand verification system to a third-party, the third-party consisting of the trademark owner.

Then, the trademark owner, by having a subsequent exclusive cryptographic entity, may further create lower level exclusive cryptographic entities, for its local branches/resellers, which optionally may also be based on the lower level digital signatures, sign with a digital signature an association of brand digital information with an URI of the websites managed by such local branches/resellers. The local branches/resellers of the central company thereby have access to the chain of trust for its websites, which therefore are also reliably linked with the original trademark.

Additionally, through the authorization of third-party accredited resellers/websites, companies/brands will markedly mitigate the online spread of counterfeits, as customers will be able to distinguish legitimate/authorized distributors of the products and services they are procuring online from the illegitimate/unauthorized ones.

Thus, the solution of the present invention provides for an eased infrastructure which maintains a high reliability of origin throughout a stakeholder network, maintaining a chain of trust or federated chain of trust. Therefore, an initial step of the method of the present invention may be for the owner of a registered trademark to obtain said certificate and thereby a self-sovereign identity confirmation from the platform.

In addition, through a proprietary platform approach authorizations/certificates are to be granted individually to an entity such as a company. This certificate will allow said company to legitimise its brand throughout the cyberspace, in a form of whitelisting.

The method of the present invention therefore also provides that an accessed website is digitally registered in the name of an owner different from an owner of the registered trademark to which it is associated, the owner of such associated website consisting of an accredited reseller of the registered trademark.

Therefore, each brand digital information and, consequently, each registered trademark, may be digitally associated with more than one website. In addition, and alternatively or cumulatively, a website may also be digitally associated with more than one brand. Such provides a quite practical solution for the cases of resellers or conglomerates.

In another embodiment of the method of the present invention, the web interface consists of a web browser or a component (such as an app or other type of program) of an operating system providing access to the web. Different vehicles may be provided to embody the web interface, such as web browsers or, for example in smartphones, through an Operating System (OS) providing access to the web, such as through an OS notification, where visible real estate is limited. In addition, the above referred exclusive cryptographic entity provides that a digital brand information/registered trademark is integrated in the web interface (namely web-browser or the operating system) at a cryptographic level. So it can't be tampered with, or cyber impersonated.

The exclusive cryptographic entity may thus contain cryptographic values (providing a fingerprint) for the purpose of the previously attributed exclusive self-sovereign identity. In a similar way to a Public Key Infrastructure or a Blockchain, when the exclusive cryptographic entity consists of a digital certificate or authorisation, it creates a unique signature pair of public and private keys.

In another embodiment of the method of the present solution, the said brand verification system consists of a plurality of computational devices connected between each other and sharing a ledger, such ledger containing information on each digital association between brand digital information and at least one Uniform Resource Indicator of a website. It therefore consists of a platform based on a ledger distributed through several devices, in a fashion similar, or which consists of, Blockchain.

Alternatively, each digital certificate operates according to a public key infrastructure, the digital certificate providing a unique cryptographic signature pair of public and private keys.

The method of the present invention allows to provide the creation of a whitelist for each brand digital information which consists of a registered trademark, such whitelist comprising a list of websites created through said lower level exclusive cryptographic entity, in turn associated with the brand digital information which consists of a registered trademark. Where the lower level exclusive cryptographic entity consists of a digital certificate, the whitelist is digitally signed with such certificate. This holistic approach to the problem of cyber-impersonation will not only create a large/extensive whitelist of domain/URI/URL's, but also provide the users with the tools to contribute to a cleaner/sanitized cyberspace of evil-doers and cybercriminals. As consequence of the previously mentioned features and characteristics this platform will further allow users to blacklist domain/URI/URL that have justly been reported and classified as nefarious, through an opt-in/out feature. Optionally, the whitelist is a federated whitelist.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A method for reliable authentication of the origin of a website, the method comprising:
   upon a request to access a website by a first device via a web interface, obtaining from a brand verification system a brand digital information;
   enveloping the brand digital information such that it is presented to the first device via the web interface,
   wherein obtaining from a brand verification system a brand digital information comprises the brand verification system obtaining brand digital information which is digitally associated with the website, wherein the brand digital information comprises a registered trademark and the website has a Uniform Resource Indicator (URI) which is digitally associated to the registered trademark in at least one server of the brand verification system,
   the method further comprising:
   prior to the request to access a website by the first device, associating at least one brand digital information with an URI of such website, such association being performed via a root exclusive cryptographic entity, the root exclusive cryptographic entity comprising a self-sovereign identity associated with the registered trademark and the URI; and
   confirming with the brand verification system which is configured to communicate with a brand registration system which consists of at least one server managed by an official trademark office that such trademark is: i) indeed registered, and ii) owned by a same entity requesting the creation of the at least one root exclusive cryptographic entity.

2. The method according to claim 1 wherein the brand digital information consists of a registered trademark.

3. The method according to claim 1 wherein obtaining a brand digital information from a brand verification system further comprises the brand verification system communicating with a brand registration system, the brand registration system consisting of at least one server managed by an official trademark office, such server comprising a plurality of registered trademarks before such official trademark office, each brand digital information comprising with one of such registered trademarks.

4. The method according to claim 3 wherein the root exclusive cryptographic entity comprises:
   the creation of a root digital certificate,
   a root transactional signature, or the creation of a root block in a Blockchain-based method, namely a root address or unique identifier in a Blockchain based method.

5. The method according to claim 1, further comprising: upon a request for the root exclusive cryptographic entity, creating at least one subsequent exclusive cryptographic entity from the root exclusive cryptographic entity, each subsequent exclusive cryptographic entity being configured to provide a further association of the brand digital information with the URI of the website.

6. The method according to claim 5 wherein:
where the root exclusive cryptographic entity consists of a root digital certificate configured to sign and thereby create the at least one subsequent exclusive cryptographic entity which consists of a subsequent digital certificate, each subsequent digital certificate being configured to sign with a digital signature an association of the brand digital information with the URI of the website,
where the root exclusive cryptographic entity consists of a block in a Blockchain-based method configured to further create the at least one subsequent exclusive cryptographic entity which consists of a subsequent block in a Blockchain-based method, each subsequent block being configured to associate the brand digital information with the URI of the website,
the least one subsequent exclusive cryptographic entity comprises a keyed-hash message authentication code (HMAC) verification, configured to associate the brand digital information with the URI of the website.

7. The method according to claim 5, wherein each subsequent exclusive cryptographic entity is further configured to create at least one lower level exclusive cryptographic entity, each lower exclusive cryptographic entity being configured to associate the brand digital information with the URI of the website and, each lower level exclusive cryptographic entity consists of:
a lower level digital certificate configured to sign with a digital signature an association of the brand digital information with the URI of the website, wherein the lower digital certificate is integrated within a public key infrastructure,
a block in a Blockchain-based method configured to associate the brand digital information with the URI of the website, wherein the block is integrated within a public ledger,
a keyed-hash message authentication code (HMAC) verification system, within a federated chain of trust of entities, associating the brand digital information with the URI of the website.

8. The method according to claim 1 wherein each brand digital information and, consequently, each registered trademark, is digitally associated with more than one website.

9. The method according to claim 1 wherein each a website is digitally associated with more than one brand digital information and, consequently, more than one registered trademark.

10. The method according to claim 1 wherein the web interface consists of a web browser or a component of an operating system providing access to the web.

11. The method according to claim 1, further comprising creating a whitelist for each brand digital information which consists of a registered trademark, such whitelist comprising a list of websites digitally associated with the brand digital information which consists of a registered trademark and wherein the whitelist is a federated whitelist to each registered trademark.

12. A computational system for reliable authentication of the origin of a website, the computational system comprising a first device and a web interface or operating system component configured to execute the steps of:
upon a request to access a website by a first device via a web interface, obtaining from a brand verification system a brand digital information,
enveloping the brand digital information such that it is presented to the first device via the web interface,
wherein obtaining from a brand verification system a brand digital information comprises the brand verification system obtaining brand digital information which is digitally associated with the website, wherein the brand digital information comprises a registered trademark and the website has a Uniform Resource Indicator (URI) which is digitally associated to the registered trademark in at least one server of the brand verification system,
prior to the request to access a website by the first device, associating at least one brand digital information with an URI of such website, such association being performed via a root exclusive cryptographic entity, the root exclusive cryptographic entity comprising a self-sovereign identity associated with the registered trademark and the URI,
upon a request for the root exclusive cryptographic entity, creating at least one subsequent exclusive cryptographic entity from said root exclusive cryptographic entity, each subsequent exclusive cryptographic entity being configured to provide a further association of the brand digital information with the URI of the website, and
confirming with the brand verification system which consists of at least one server managed by an official trademark office whether such trademark is: i) indeed registered, and ii) owned by a same entity requesting the creation of the at least one subsequent exclusive cryptographic entity.

13. A non-transitory storage media including program instructions for causing a suitably programmed system to reliably authenticate the origin of a website, by performing the following steps when such program instructions are executed on the system, the steps comprising:
upon a request to access a website by a first device via a web interface, obtaining from a brand verification system a brand digital information;
enveloping the brand digital information such that it is presented to the first device via the web interface,
wherein obtaining from a brand verification system a brand digital information comprises the brand verification system obtaining brand digital information which is digitally associated with the website, wherein the brand digital information comprises a registered trademark and the website has a Uniform Resource Indicator (URI) which is digitally associated to the registered trademark in at least one server of the brand verification system,
the steps further comprising:
prior to the request to access a website by the first device, associating at least one brand digital information with an URI of such website, such association being performed via a root exclusive cryptographic entity, the root exclusive cryptographic entity comprising a self-sovereign identity associated with the registered trademark and the URI;
upon a request for the root exclusive cryptographic entity, creating at least one subsequent exclusive cryptographic entity from said root exclusive cryptographic entity, each subsequent exclusive cryptographic entity being configured to provide a further association of the brand digital information with the URI of the website, and confirming with the brand verification system which consists of at least one server managed by an official trademark office whether such trademark is: i) indeed registered, and ii) owned by a same entity requesting the creation of the at least one subsequent exclusive cryptographic entity.

\* \* \* \* \*